(No Model.)

G. H. ELLIS.
TWINE AND PROCESS OF MANUFACTURING SAME.

No. 536,421. Patented Mar. 26, 1895.

Witnesses.
Arthur Johnson
Elsie M Halverson.

Inventor.
George H. Ellis

UNITED STATES PATENT OFFICE.

GEORGE H. ELLIS, OF CHICAGO, ILLINOIS.

TWINE AND PROCESS OF MANUFACTURING SAME.

SPECIFICATION forming part of Letters Patent No. 536,421, dated March 26, 1895.

Application filed September 28, 1891. Serial No. 407,022. (No specimens.)

*To all whom it may concern:*

Be it known that I, GEORGE H. ELLIS, of Chicago, in the county of Cook and State of Illinois, have invented certain new and useful Improvements in Twine and in Processes of Manufacturing the Same, of which the following is a full description, reference being had to the accompanying drawings, in which—

Figure 1:
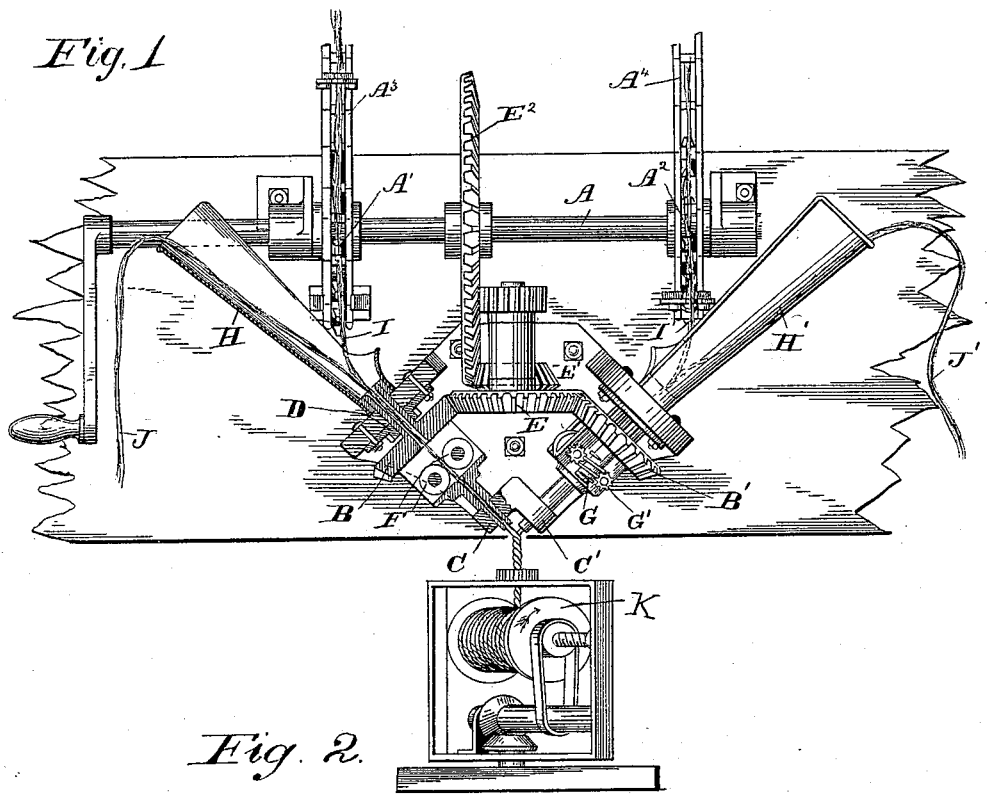
Figure 2:
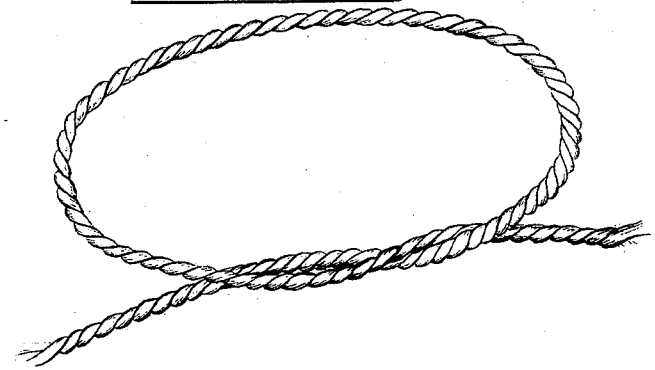

Figure 1 shows the machine for making my twine, partly in section and illustrates the process of making the same. Fig. 2 represents the twine.

I have heretofore patented the machine, parts of which are shown in Fig. 1, as will be found by reference to Patent No. 433,856, of August 5, 1890, and will in this specification, with the aid of the illustration representing the necessary parts, little more than describe the process of manufacture.

My object is to provide a cheap twine suitable for use in binding grain, and its nature consists in spinning together a sliver of blades of slough grass, or other suitable grass or straw as may be chosen to give size to the twine, and a sliver of Sisal fiber, Manila fiber, or other suitable fiber to give strength, and forming them into a cord.

I have ever found difficulty in forming a sliver of blades of grass or straws of any great length for the reason that they are so stiff as to not entangle and have any adhesion. A sliver of such material, if ever so carefully formed, at once drops apart when attempts are made to handle it. For this reason I avoid the necessity of preparing a sliver of hay and the difficulty of handling it, by depositing wisps of the grass blades or straw upon the moving sliver formed of sisal, manila or other suitable substances. By this process I am able to utilize a fiber that has not been successfully used before except in quite coarse cords, and to make a twine that can be used upon ordinary grain binders without any modification of the knotting and holding devices. In short, the object is to make it possible to use a slough-grass or straw for binding twine by the admixture therewith in a proper manner of a strong fiber that may serve to be grasped and held by the holding devices even though the latter sever or bite off the weaker fibers.

For use in grain binders, I find it preferable to form the cord in two or more strands and twist them together. In this way I get a twine of sufficient size to be held and operated upon by the knotting devices, of sufficient flexibility and of sufficient strength, and cheap in cost as compared with twines composed wholly of more expensive fibers—manila, sisal, &c.

In Fig. 1, A, is a power shaft, having sprocket wheels A' and A², which carry feed chains A³ and A⁴. The latter are adapted to take blades of grass or straws from a reservoir and deliver them to the spinners, preferably located immediately below. The spinners consist of rotary tubes, each as one piece with the bevel gears B and B'. These gears are adapted to revolve in bearings C and C' at the lower ends, and at D at the upper ends, as shown where the spinners are bisected. The gears in the hubs of which these tubes are formed are given rotation by the gear E, which is as one piece with the gear E', which in turn is moved by the gear E². In the twisting tubes, or fliers as I will term them, are feed rollers F. These are caused to rotate by the screw G acting in worm wheels G'. I have shown two of the spinners, but if three strands of twine are required another may be added.

H and H', are the hoppers into which the feeding chains convey the grass or straws from the supply boxes.

I have now described the machinery which I use for making the twine forming the subject matter of this application and the process of manufacturing the same, sufficiently well for a proper understanding of such product and process, but I refer to my Patent No. 433,856, where the machine will be found minutely described.

I and I' represent the slivers of grass being fed by the chains into the hoppers H and H'.

J and J' represent slivers of manila, or other strong fiber, which extend from suitable sliver cans up over the edges of the hoppers and down therein, and are fed through the spinner or spinners simultaneously with the coarser fibers of straw or grass by means of the rollers F. The rotation of each spinner twists the strand passing through it, and the rotation of the spool onto which the twine passes twists two or more strands together. This spool, K, I have shown located below the spinners. It is adapted to rotate in the direction indicated by the arrow, as in my former patent referred to.

What I claim as my invention, and desire to secure by Letters Patent, is—

1. A twisted twine composed of a sliver of hay or straw and a sliver of stronger fiber, as manila, twisted together, substantially as described.

2. A twisted twine consisting of a plurality of strands, each strand composed of a coarse fiber, as grass or straw, and another of stronger fiber, as manila or sisal, each of said strands formed by twisting slivers of the material of which it is composed, and the said strands twisted together, substantially as described.

3. The method of making twine of hay or straw by laying the hay or straw fibers in the form of wisps upon a constantly moving sliver of sisal or manila and twisting the two together.

4. The method of making twine of a plurality of strands consisting in laying upon slivers of a stronger fiber, hay or straw in the form of wisps and spinning the same into the said strand by twisting the latter together, substantially as described.

GEORGE H. ELLIS.

Witnesses:
ELISE M. HALVERSON,
ARTHUR JOHNSON.